(12) United States Patent

Chen

(10) Patent No.: US 7,034,840 B2

(45) Date of Patent: Apr. 25, 2006

(54) METHOD FOR AN IMAGE REDUCING PROCESSING CIRCUIT

(75) Inventor: Chia-Hsin Chen, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 0 days.

(21) Appl. No.: 10/692,683

(22) Filed: Oct. 27, 2003

(65) Prior Publication Data

US 2005/0088451 A1 Apr. 28, 2005

(51) Int. Cl.

*G09G 5/36* (2006.01)
*G06T 1/60* (2006.01)
*G06F 13/00* (2006.01)

(52) U.S. Cl. ...................... 345/558; 345/530; 345/536; 345/670

(58) Field of Classification Search ................ 345/558, 345/530, 536, 560, 418, 619, 660, 665, 667, 345/670, 501, 502

See application file for complete search history.

(56) References Cited

U.S. PATENT DOCUMENTS

| | | | | |
|---|---|---|---|---|
| 4,646,151 | A * | 2/1987 | Welles et al. | 348/513 |
| 5,594,467 | A * | 1/1997 | Marlton et al. | 345/641 |
| 6,184,907 | B1 * | 2/2001 | Min | 345/558 |
| 6,333,788 | B1 * | 12/2001 | Yamada et al. | 358/1.15 |
| 6,701,393 | B1 * | 3/2004 | Kemeny et al. | 710/40 |
| 6,831,700 | B1 * | 12/2004 | Hoshikawa | 348/446 |

* cited by examiner

*Primary Examiner*—Kee M. Tung
*Assistant Examiner*—Joni Hsu

(57) ABSTRACT

A method for an image reducing processing circuit includes the memory architecture of two FIFO units. The method includes the following steps of: providing an input processing unit receiving original image data and delivering the image data; providing a horizontal direction image processing unit receiving the image data from the input processing unit; providing a first step FIFO unit receiving the image data from the horizontal direction image processing unit to read and write the image data on the same access frequency; providing a vertical direction image processing unit receiving the image data from the first step FIFO unit; providing a second step FIFO unit receiving the image data from the vertical direction image processing unit and implementing the readout/writing of the image data on two access frequency, and providing an output processing unit receiving the image data from the second step FIFO unit and outputting reduced image.

13 Claims, 7 Drawing Sheets

METHOD FOR AN IMAGE REDUCING PROCESSING CIRCUIT

FIELD OF THE INVENTION

The present invention relates to a method for an image reducing processing circuit, and more particularly to the method for the image reducing processing circuit including a memory architecture of two First-In-First-Out (FIFO) units.

BACKGROUND OF THE INVENTION

Recently, a hand-held image display system and a portable multimedia image display system mostly have smaller and lower resolution display element because of minimization and convenience. According to a signal resource such as signal of a television and a display card, the resolution of the signal resource has been defined in the past and is larger than the necessary resolution of the above-mentioned product (i.e., the above-mentioned image display system), and therefore it is more important to have a image processing circuit with the selective reduction of image and low power consumption.

A conventional method for image reducing processing circuit utilizes the architecture of a line buffer in order to get more completely image data in the subsequent process. An inputted image data is temporarily stored in a memory line by line and then is processed. Because the architecture of the line buffer is utilized, a memory implements the reading and writing and can processes input image data and output image data with different frequency at the same time so as to increase the complexity of circuit. Furthermore, the memory stores the data of whole line, and therefore the requirement for the capacity of the memory is increased as well.

Referring to FIGS. 1 and 2, the architecture of the image reducing processing circuit includes a pre-position data processing unit 10, a line buffer units 11, a vertical direction image processing unit 12, a horizontal direction image processing unit 13 and a post-position data processing unit 14. The image data (i.e., original images 1*a*) are firstly processed by the pre-position data processing unit 10, and then the original image 1*a* with the same first access frequency 1*c* is delivered to the line buffer units 11. According to the input sequence of the image data, the image data is stored to N sets of the line buffer 120, the vertical direction image processing unit 12, and the horizontal direction image processing unit 13 one by one. With the second frequency 1*d*, the image data is processed in parallel way by the line buffer unit 11 and finally delivered to the post-position processing unit 14 so as to output a reduced image 1*b*.

In conclusion, the size of the reduced image 1*b* is smaller than that of the input original image 1*a* in the above-mentioned architecture of the image reducing processing circuit. Because of using the architecture of the line buffer unit 11, the memory depth of the line buffer unit 11 will be designed and the same as that of the original image 1*a*. If the size of the input original image 1*a* is much bigger than that of the output reduced image 1*b*, the capacity of the memory will be increased. The first frequency 1*c* and the second frequency 1*d* are used in the input and output of the line buffer unit 11 at the same time and are access frequency both, and therefore the circuit complexity of the memory during the memory implement the readout and writing of the image data at the same time.

Accordingly, there exists a need for the method for the image reducing processing circuit to solve the above-mentioned problems and disadvantages.

SUMMARY OF THE INVENTION

The present invention to provide a method for an image reducing processing circuit including the memory architecture of two First-In-First-Out (FIFO) units for simplifying the using of access frequency and memory depth.

The method for the image reducing processing circuit according to the present invention includes the memory architecture of two First-In-First-Out (FIFO) units, and the method firstly processes the horizontal direction image data and then processes the vertical direction image data, such that the memory depth of the first step First-In-First-Out (FIFO) unit is designed and is only substantially equal to that of the reduced image. The memory depth of the first step First-In-First-Out (FIFO) unit is less than that of the line buffers. By using the memory architecture of two First-In-First-Out (FIFO) units, the access frequency of the input processing unit, the horizontal direction image processing unit, the first step First-In-First-Out (FIFO) unit and the vertical direction image processing unit are simplified to the first access frequency only. The memory architecture of the second step First-In-First-Out (FIFO) unit is simplified to an one-input-one output-memory architecture, which only implements a transferring of the first and second access frequency, so the memory depth of the second step First-In-First-Out (FIFO) unit is much less than that the original image and the reduced image.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
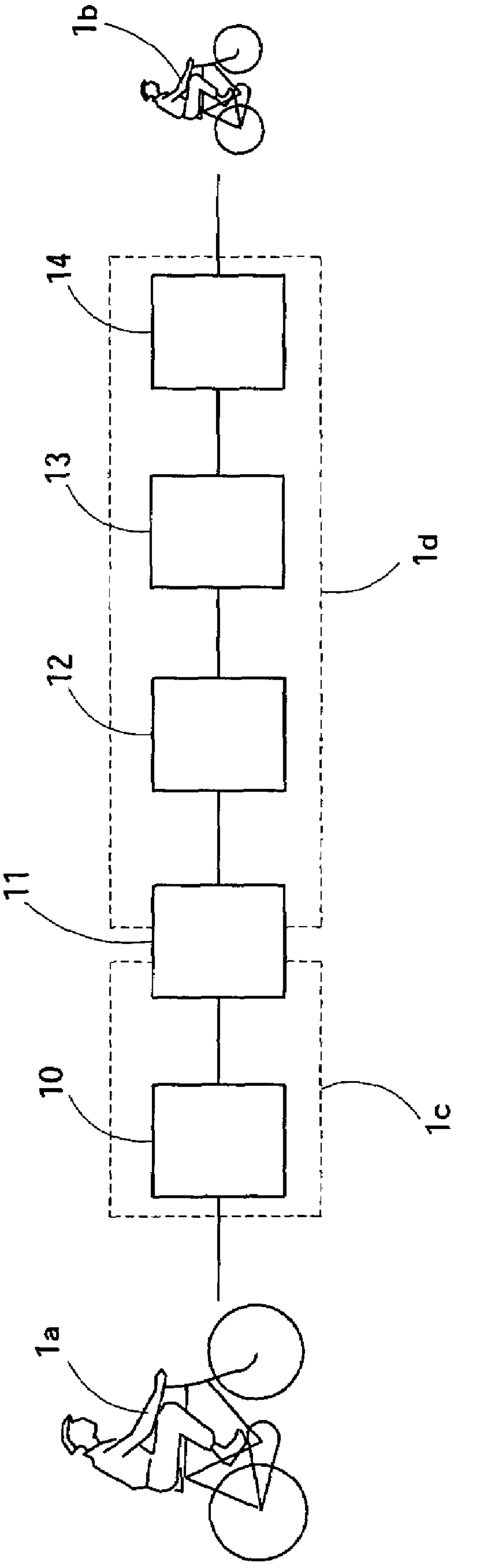
Fig.1 PRIOR ART
FIG. 1 is a block diagram of the architecture of an image reducing processing circuit with line buffers in the prior art.
Figure 2:
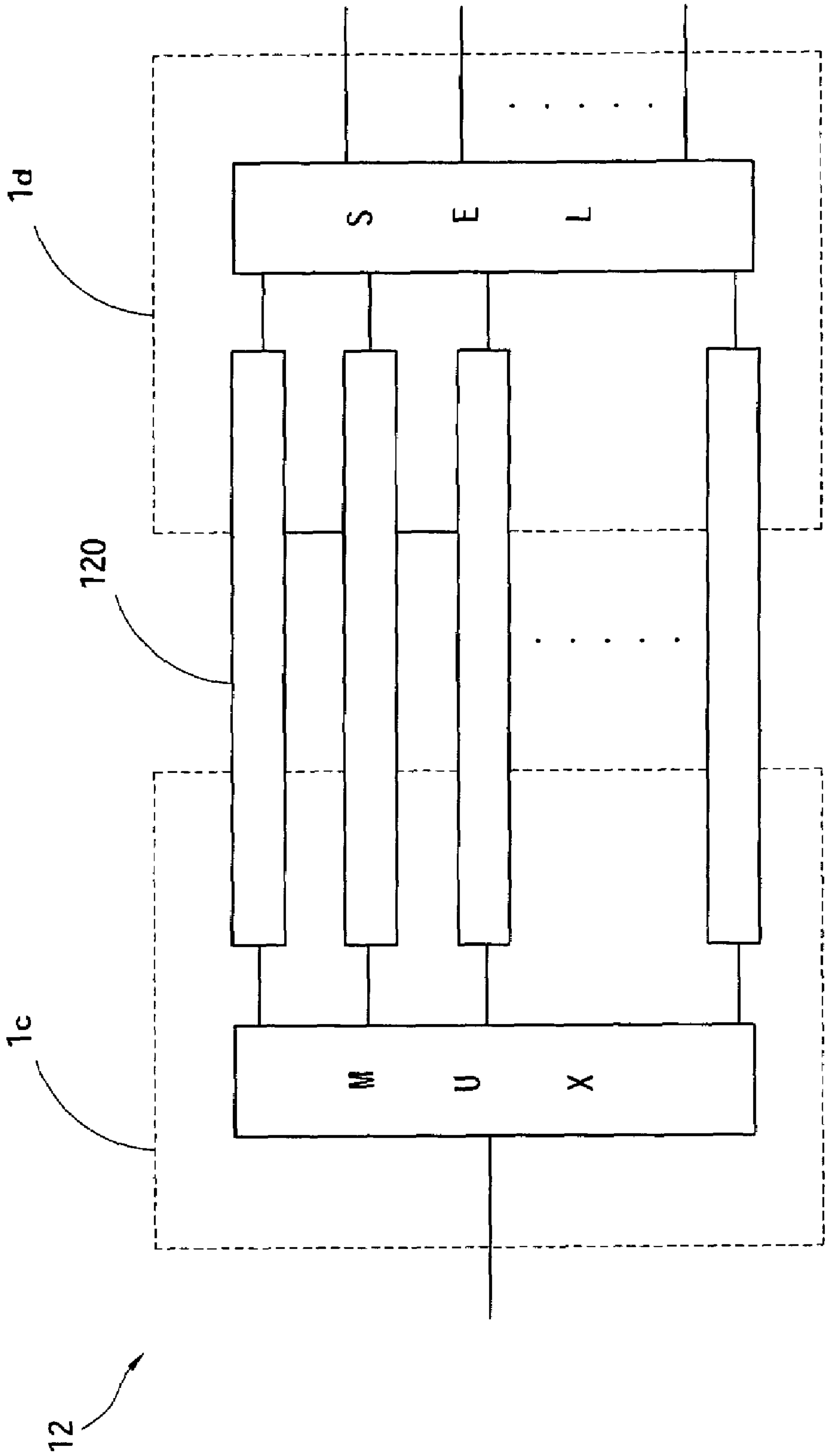
Fig.2 PRIOR ART
FIG. 2 is a block diagram of the architecture of line buffers in the prior art.
Figure 3:
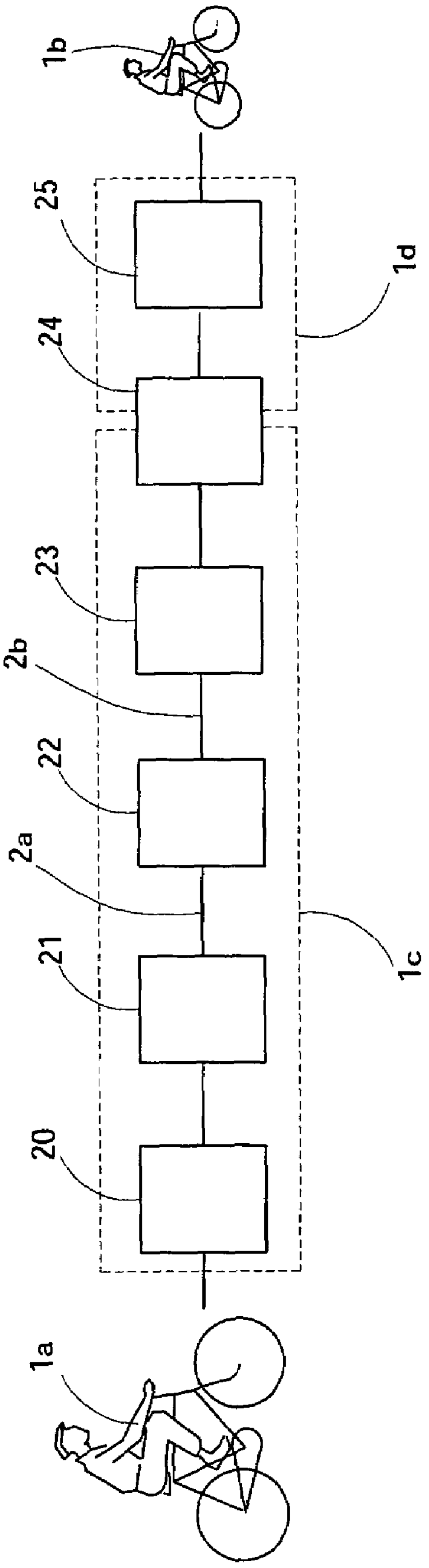
FIG. 3 is a block diagram of the architecture of an image reducing processing circuit with two First-In-First-Out (FIFO) units according to the present invention.

Referring to FIG. 3, which includes an input processing unit 20, a horizontal direction image processing unit 21, a first step First-In-First-Out (FIFO) unit 22, a vertical direction image processing unit 23, a second step First-In-First-Out (FIFO) unit 24 and an output processing unit 25. Image data (i.e., original images 1*a*) are firstly processed by the input processing unit 20 and then the original image 1*a* with the same first access frequency 1*c* delivered to the horizontal direction image processing unit 21. The horizontal direction image processing unit 21 receives the image data from the input processing unit 20. The first step First-In-First-Out (FIFO) unit 22 receives the image data from the horizontal direction image processing unit 21 to read and write the image data with the same first access frequency 1*c*. The vertical direction image processing unit 23 receives the image data from the first step First-In-First-Out (FIFO) unit 22, reads and writes completely the image data, quantifies the image data in the vertical direction, and then transfer the image data to row signals with a row column type. The second step First-In-First-Out (FIFO) unit 24 receives the image data from the vertical direction image processing unit 23 and transfers from the access frequency 1*c* to the access frequency 1*d*. The output processing unit receives the image data from the second step First-In-First-Out (FIFO) unit 25 and outputs the reduced image 1*b* on the access frequency 1*d*.

Figure 4:
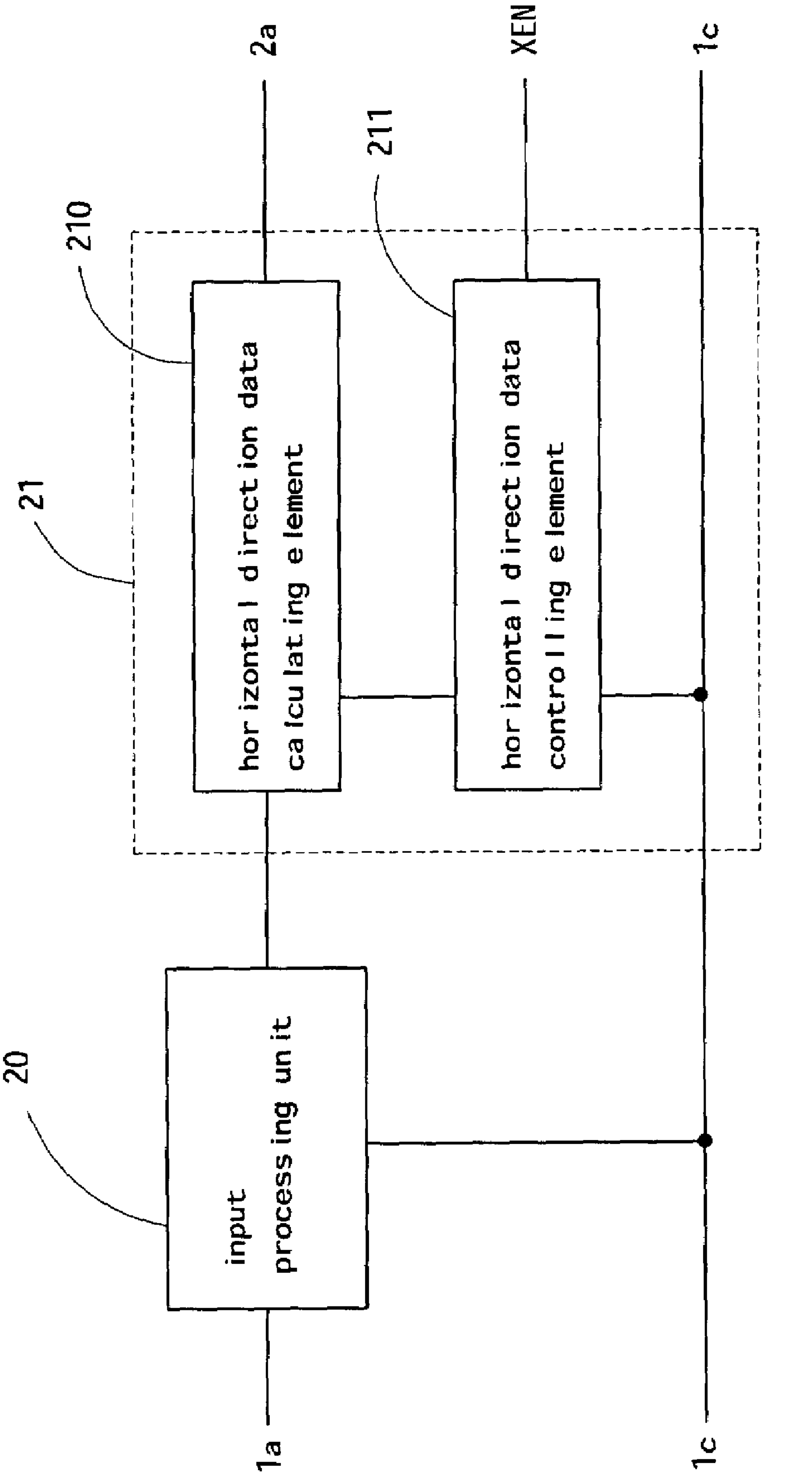
FIG. 4 is a block diagram of the architecture of an input processing unit and the horizontal direction image processing unit according to the present invention

Referring to FIG. 4, the horizontal direction image processing unit 21 includes a horizontal direction data calculating element 210 and a horizontal direction data controlling element 211. The horizontal direction data calculating element 210 calculates in real time and processes the image data from the input processing unit 20 and the filtering parameter generated from the horizontal direction data controlling element 211 so as to generate new horizontal direction image data 2*a*, and the horizontal direction data controlling element 211 generates new image controlling signals XEN to control whether the image data are dumped or not.

Figure 5:
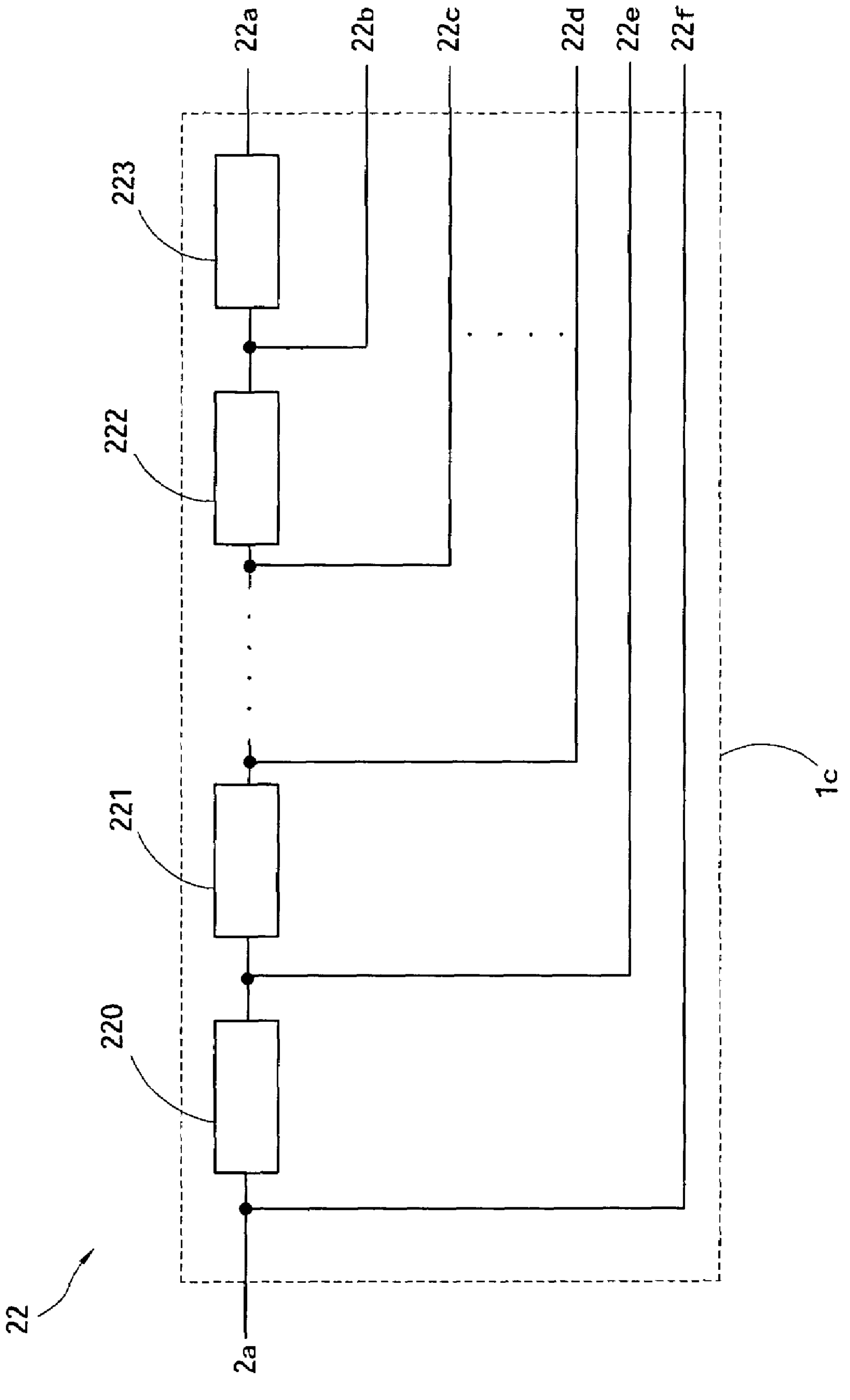
FIG. 5 is a block diagram of the architecture of a first step First-In-First-Out (FIFO) unit according to the present invention.

Referring to FIGS. 3, 4 and 5, the first step First-In-First-Out (FIFO) unit 22 includes N sets of First-In-First-Out (FIFO) sub unit (220, 221, 222, 223) receives and delivers the image data in sequence. As following up the image controlling signals XEN generated by the horizontal direction data controlling element 211, the image data from the horizontal direction image processing unit 21 are delivered step by step in sequence form the horizontal direction image processing unit 21 to the First-In-First-Out sub unit 220. Simultaneously, the First-In-First-Out sub unit 220 delivers the image data to next the First-In-First-Out sub unit 221, and another First-In-First-Out sub unit (220, 221, 222, 223) have similar logic way like the First-Out sub unit 220.

Figure 6:
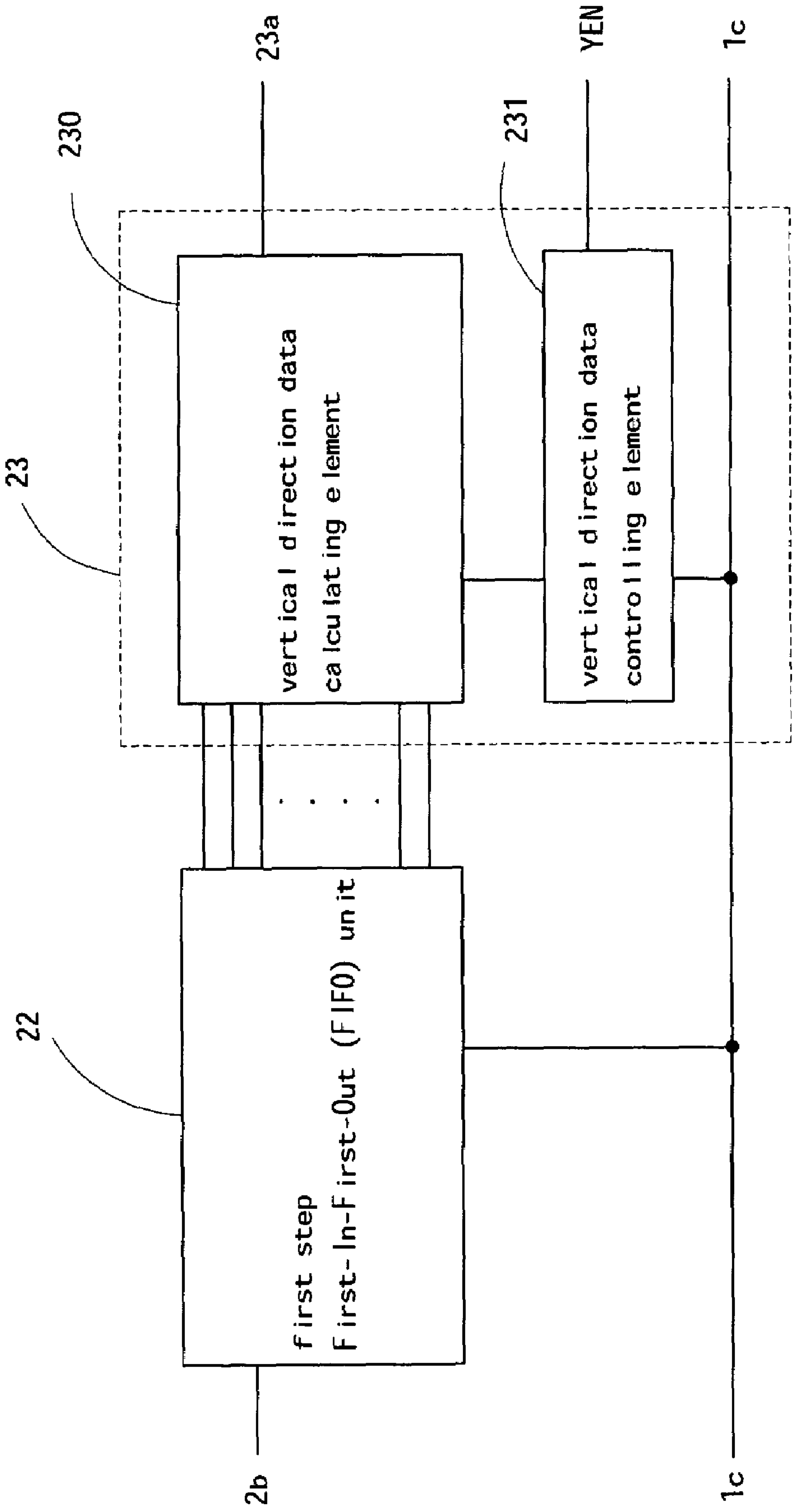
FIG. 6 is a block diagram of the architecture of a vertical direction image processing unit according to the present invention.

Referring to FIGS. 3 and 6, the vertical direction image processing unit 23 includes a vertical direction data calculating element 230 and a vertical direction data controlling element 231. The vertical direction data calculating element 230 calculates in real time and processes the image data from the first step First-In-First-Out (FIFO) unit 22, the horizontal direction image data 2*a* generated from the horizontal direction image processing unit 21, and the filtering parameter generated from the vertical direction data controlling element 231 so as to generate new vertical direction image data 23*a*, and the vertical direction data controlling element 231 generates new image controlling signals YEN to control whether the image data are dumped or not.

Figure 7:
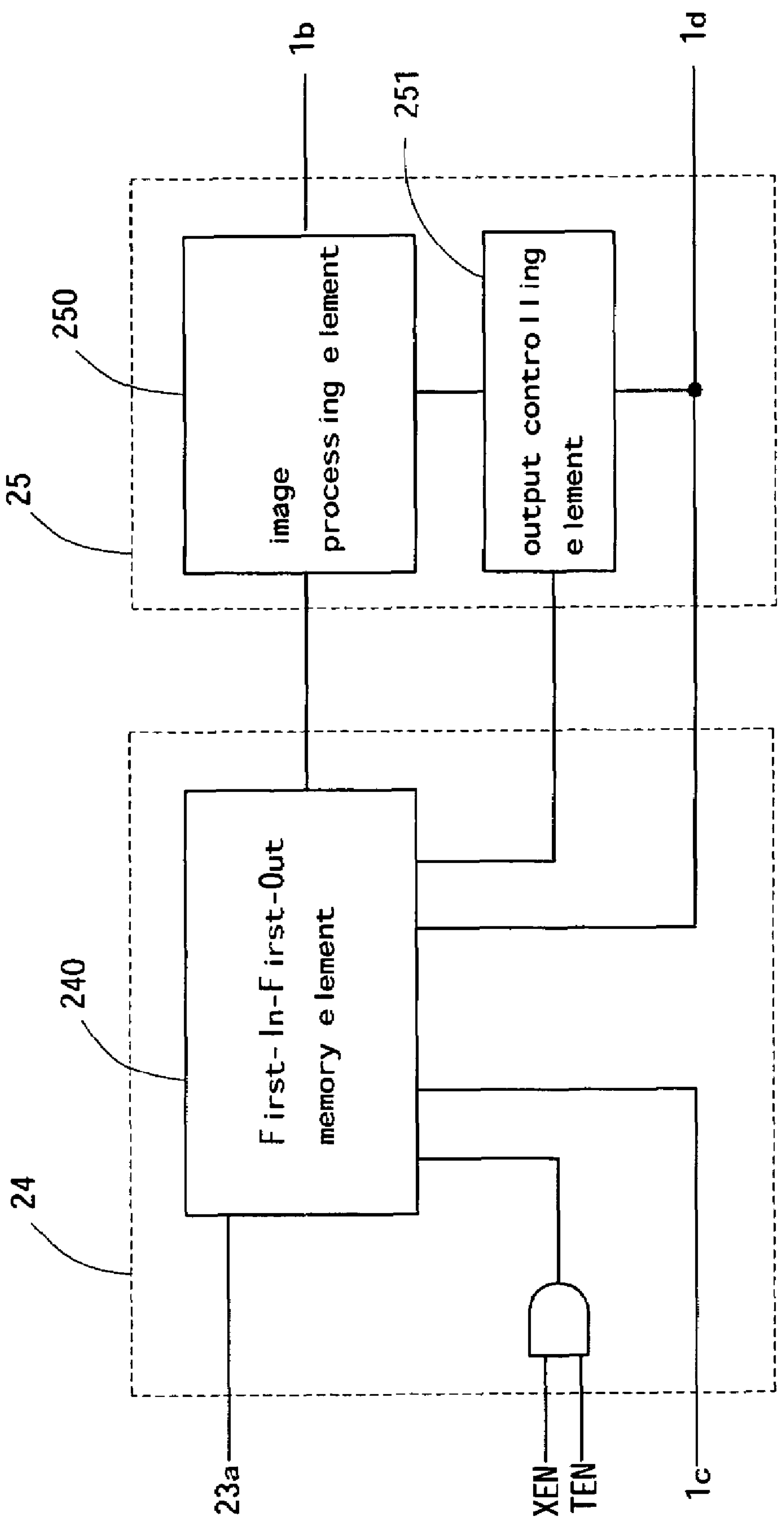
FIG. 7 is a block diagram of the architecture of a second step First-In-First-Out (FIFO) unit and an output processing unit according to the present invention.

Referring to FIGS. 4, 6 and 7, the second step First-In-First-Out (FIFO) unit 24 includes a First-In-First-Out memory element 240 with N bit capacity implementing the readout and writing of the image data on two different frequency: the first access frequency 1*c* and a second access frequency 1*d*. As following up the image controlling signals YEN generated by the vertical direction data controlling element 231 and the image controlling signals XEN generated by the horizontal direction data controlling element 211, and the vertical direction image data 23*a* from the vertical direction image processing unit 23 are delivered to the First-In-First-Out memory element 240 with N bit capacity on the access frequency 1*c*. The output processing unit 25 includes an image processing element 250 and an output controlling element 251. The reading signal generated by the output controlling element 251 and delivered to the second step First-In-First-Out (FIFO) unit 24, and the image data are delivered to the image processing element 250 on the second access frequency 1*d* so as to output a reduced image 1*b*.

In conclusion, a method for an image reducing processing circuit according to the present invention includes the memory architecture of two First-In-First-Out (FIFO) units, and the method firstly processes the horizontal direction image data and then processes the vertical direction image data, such that the memory depth of the first step First-In-First-Out (FIFO) unit is designed and is only substantially equal to that of the reduced image 1*b*. As the memory depth of the line buffers is equal to that of the original image 1*a*, the memory depth of the first step First-In-First-Out (FIFO) unit is less than that of the line buffers (1*b*<1*a*). By using the memory architecture of two First-In-First-Out (FIFO) units, the access frequency of the input processing unit, the horizontal direction image processing unit, the first step First-In-First-Out (FIFO) unit and the vertical direction image processing unit are simplified to the first access frequency 1*c* only. The memory architecture of the second step First-In-First-Out (FIFO) unit is simplified to a one-input-one-output memory architecture, which only implements a transferring of the first and second access frequency 1*c* and 1*d*, so the memory depth of the second step First-In-First-Out (FIFO) unit 24 is much less than that the original image 1*a* and the reduced image 1*b*.

What is claimed is:

1. A circuit for downscaling a source image in both horizontal and vertical directions to generate a destination image, comprising:

an input processing unit, adapted for receiving said source image, providing image data at a first access frequency;

a horizontal direction image processing unit, electrically coupled to said input processing unit, receiving said image data at said first access frequency from said input processing unit and downscaling said image data in said horizontal direction to generate first temporary image data at said first access frequency;

a first stage line buffer unit, electrically coupled to said horizontal direction image processing unit, temporarily storing said first temporary image data at said first access frequency, wherein said first stage line buffer unit comprises a plurality of line buffers in series for periodic storing of said first temporary image data in each of said line buffers;

a vertical direction image processing unit, electrically coupled to said first stage line buffer unit, receiving said first temporary image data at said first access frequency from said first stage line buffer unit and downscaling said first temporary image data in said vertical direction to generate second temporary image data at said first access frequency;

a second stage line buffer unit, electrically coupled to said vertical direction image processing unit, temporarily storing said second temporary image data at said first access frequency; and an output processing unit, electrically coupled to said second stage line buffer unit, reading said second temporary image data from said second stage line buffer unit at a second access frequency to generate said destination image.

2. The circuit, as recited in claim 1, wherein said first stage line buffer unit is a first stage First-In-First-Out buffer unit comprising a plurality of First-In-First-Out buffers in series, wherein input terminals of said First-In-First-Out buffers are output terminals of said first stage line buffer unit.

3. The circuit, as recited in claim 1, wherein said second stage line buffer unit is a second stage First-In-First-Out buffer.

4. The circuit, as recited in claim 2, wherein said second stage line buffer unit is a second stage First-In-First-Out buffer.

5. The circuit, as recited in claim 1, wherein said horizontal direction image processing unit comprises:

a horizontal direction data calculating element, electrically coupled to said input processing unit, receiving said image data at said first access frequency from said input processing unit and downscaling said image data in said horizontal direction to generate said first temporary image data at said first access frequency; and a horizontal direction data controlling element, electrically coupled to said horizontal direction data calculating element, controlling said horizontal direction data calculating element to receive said image data at said first access frequency and to generate said first temporary image data at said first access frequency.

6. The circuit, as recited in claim 4, wherein said horizontal direction image processing unit comprises:

a horizontal direction data calculating element, electrically coupled to said input processing unit, receiving said image data at said first access frequency from said input processing unit and downscaling said image data in said horizontal direction to generate said first temporary image data at said first access frequency; and a horizontal direction data controlling element, electrically coupled to said horizontal direction data calculating element, controlling said horizontal direction data calculating element to receive said image data at said first access frequency and to generate said first temporary image data at said first access frequency.

7. The circuit, as recited in claim 1, wherein said vertical direction image processing unit comprises:

a vertical direction data calculating element, coupled to said first stage line buffer unit, receiving said first temporary image data at said first access frequency from said first stage line buffer unit and downscaling said first temporary image data in said vertical direction to generate said second temporary image data at said first access frequency; and a vertical direction data controlling element, electrically coupled to said vertical direction data calculating element, controlling said vertical direction data calculating element to receive said first temporary image data at said first access frequency and to generate said second temporary image data at said first access frequency.

8. The circuit, as recited in claim 2, wherein said vertical direction image processing unit comprises:

a vertical direction data calculating element, coupled to said first stage line buffer unit, receiving said first temporary image data at said first access frequency from said first stage line buffer unit and downscaling said first temporary image data in said vertical direction to generate said second temporary image data at said first access frequency; and a vertical direction data controlling element, electrically coupled to said vertical direction data calculating element, controlling said vertical direction data calculating element to receive said first temporary image data at said first access frequency and to generate said second temporary image data at said first access frequency.

9. The circuit, as recited in claim 6, wherein said vertical direction image processing unit comprises:

a vertical direction data calculating element, coupled to said first stage line buffer unit, receiving said first temporary image data at said first access frequency from said first stage line buffer unit and downscaling said first temporary image data in said vertical direction to generate said second temporary image data at said first access frequency; and a vertical direction data controlling element, electrically coupled to said vertical direction data calculating element, controlling said vertical direction data calculating element to receive said first temporary image data at said first access frequency and to generate said second temporary image data at said first access frequency.

10. A method for downscaling source image in both horizontal and vertical directions to generate destination image, comprising the steps of:

(a) receiving a source image and providing image data at a first access frequency;

(b) downscaling said image data in a horizontal direction to generate first temporary image data at said first access frequency;

(c) temporarily storing said first temporary image data at said first access frequency in a first stage line buffer unit, wherein said first stage line buffer unit comprises a plurality of line buffers in series for periodic storing of said first temporary image data in each of said line buffers;

(d) receiving said first temporary image data at said first access frequency from said first stage line buffer unit and downscaling said first temporary image data in a vertical direction to generate second temporary image data at said first access frequency;

(e) temporarily storing said second temporary image data at said first access frequency in a second stage line buffer unit; and (f) reading said second temporary image data from said second stage line buffer unit at a second access frequency to generate a destination image.

11. The method, as recited in claim 10, wherein said first stage line buffer unit is a first stage First-In-First-Out buffer unit comprising a plurality of First-In-First-Out buffers in series, wherein input terminals of said First-In-First-Out buffers are output terminals of said first stage line buffer unit.

12. The method, as recited in claim 10, wherein said second stage line buffer unit is a second stage First-In-First-Out buffer.

13. The method, as recited in claim 11, wherein said second stage line buffer unit is a second stage First-In-First-Out buffer.

* * * * *